E. HOPKINSON.
METHOD OF MAKING MOTOR VEHICLE TIRES.
APPLICATION FILED JAN. 4, 1917.
1,374,505.
Patented Apr. 12, 1921.
7 SHEETS—SHEET 1.
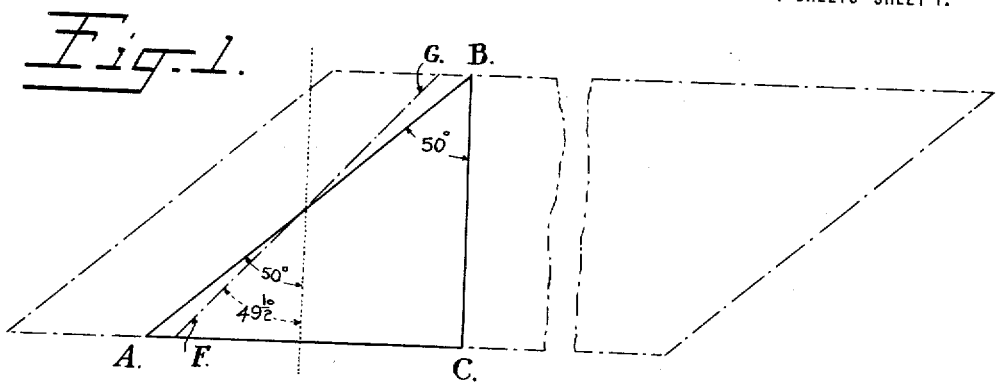
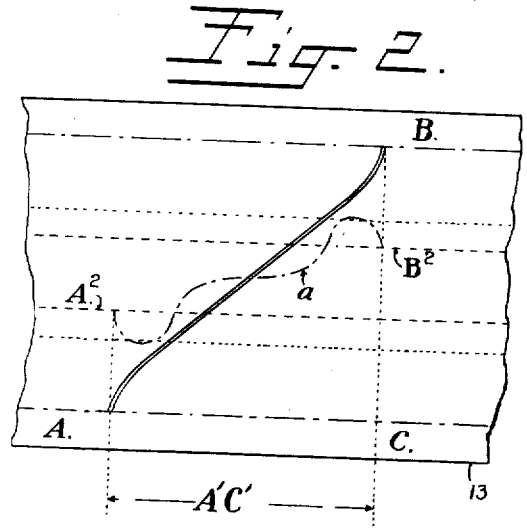
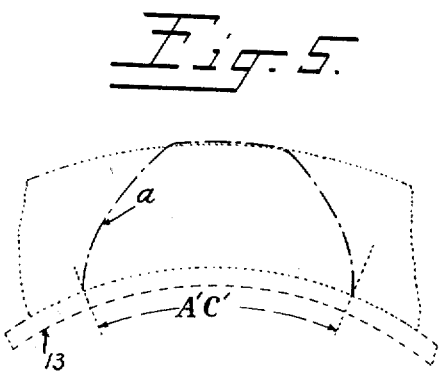
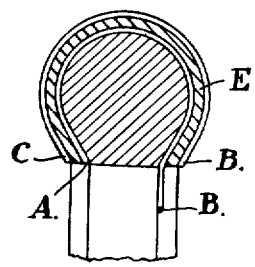
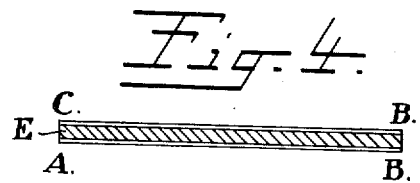
Attest:
S. E. Taylor
Inventor:
Ernest Hopkinson

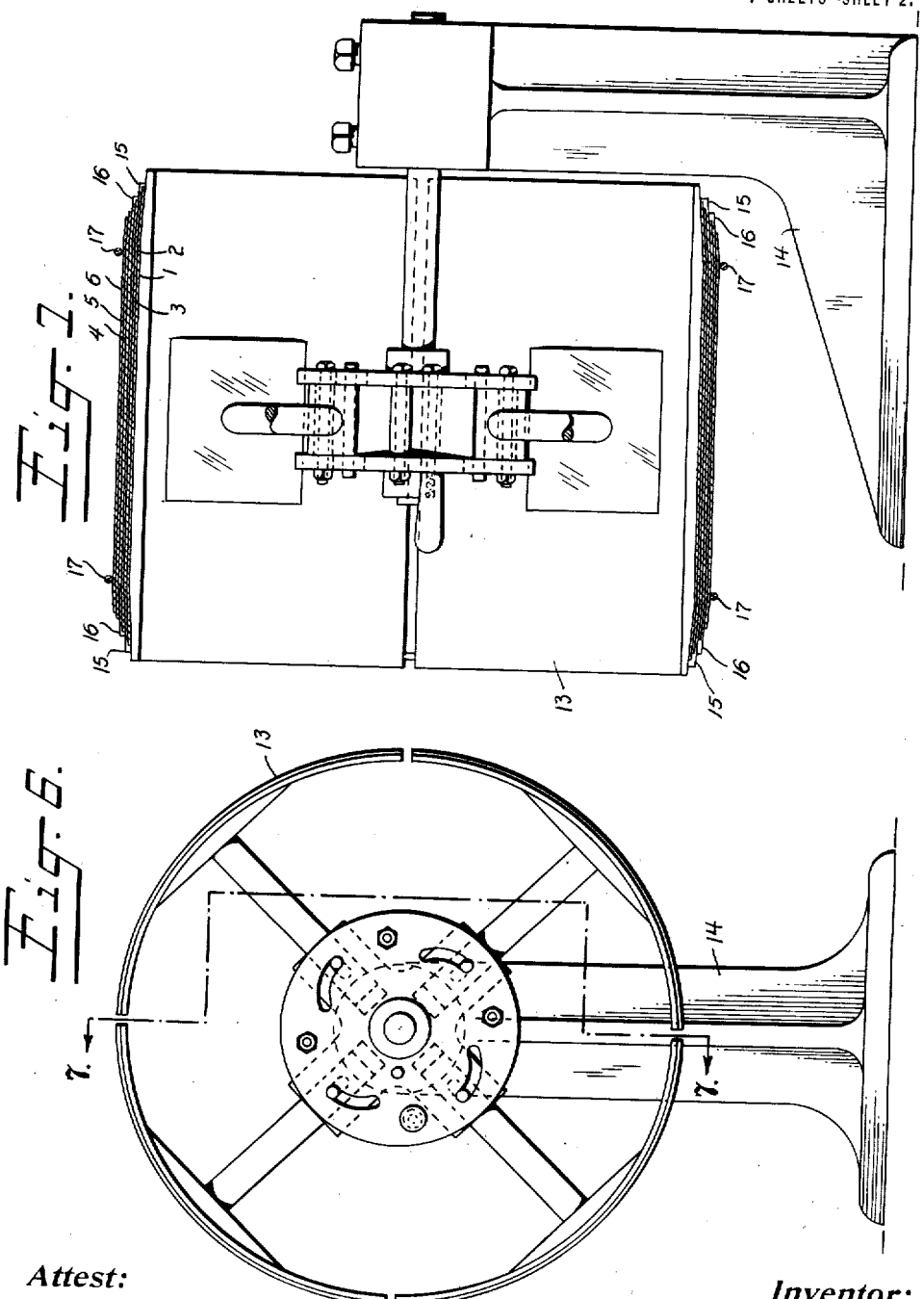

E. HOPKINSON.
METHOD OF MAKING MOTOR VEHICLE TIRES.
APPLICATION FILED JAN. 4, 1917.

1,374,505.

Patented Apr. 12, 1921.

Attest:
S. F. Taylor

Inventor:
Ernest Hopkinson

E. HOPKINSON.
METHOD OF MAKING MOTOR VEHICLE TIRES.
APPLICATION FILED JAN. 4, 1917.

1,374,505.

Patented Apr. 12, 1921.
7 SHEETS—SHEET 4.

Attest:

Inventor:
Ernest Hopkinson

E. HOPKINSON.
METHOD OF MAKING MOTOR VEHICLE TIRES.
APPLICATION FILED JAN. 4, 1917.

1,374,505.

Patented Apr. 12, 1921.
7 SHEETS—SHEET 5.

Attest:
S. G. Taylor

Inventor:
Ernest Hopkinson

E. HOPKINSON.
METHOD OF MAKING MOTOR VEHICLE TIRES.
APPLICATION FILED JAN. 4, 1917.
1,374,505.
Patented Apr. 12, 1921.
7 SHEETS—SHEET 6.
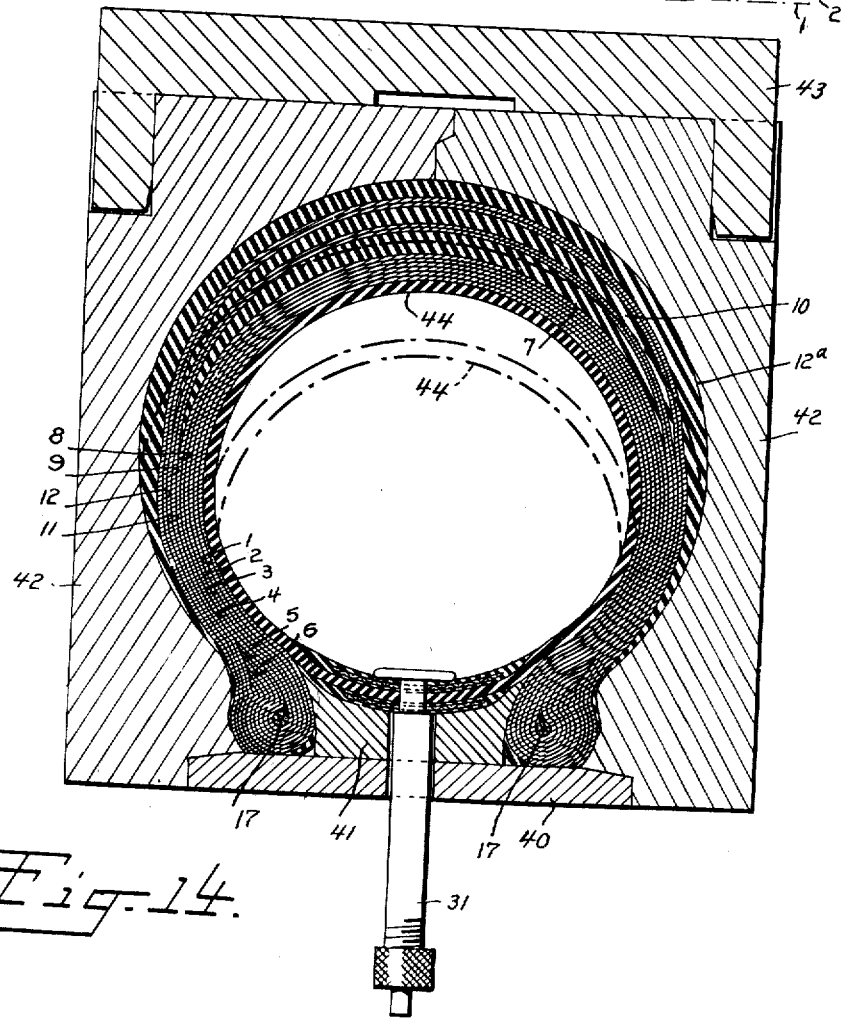
Attest:
S. G. Taylor
Inventor:
Ernest Hopkinson E. HOPKINSON.
METHOD OF MAKING MOTOR VEHICLE TIRES.
APPLICATION FILED JAN. 4, 1917.

1,374,505.

Patented Apr. 12, 1921.
7 SHEETS—SHEET 7.

Attest:

Inventor:

UNITED STATES PATENT OFFICE.

ERNEST HOPKINSON, OF NEW YORK, N. Y.

METHOD OF MAKING MOTOR-VEHICLE TIRES.

1,374,505.  Specification of Letters Patent.  Patented Apr. 12, 1921.

Application filed January 4, 1917. Serial No. 140,508.

*To all whom it may concern:*

Be it known that I, ERNEST HOPKINSON, a citizen of the United States, residing in New York city, county of New York, and State of New York, have invented certain new and useful Improvements in Methods of Making Motor-Vehicle Tires, of which the following is a full, clear, and exact description.

The present invention relates to vehicle tires made of rubber and fibrous materials and particularly to pneumatic tires of heavy strong construction having a thick wall structure such as are necessary for motor-driven vehicles. Further, the object of the invention is to provide a new tire of very much improved quality by means of a new method of construction and apparatus for accomplishing the desired results.

The present application is a continuation in part of the subject-matter set forth in application Serial No. 84,565, filed by me March 16, 1916, method and apparatus for building pneumatic tires for automobiles, and application Serial No. 84,955, filed March 17, 1916, pneumatic tires and method of making the same.

Tires for motor-driven vehicles are now usually made by forming or shaping strips of fabric, whether woven or consisting of parallel threads mainly held together by rubber, on a heavy metal core of substantially the shape of the cavity of the tire casing when inflated on the wheel with which it is designed to be used. After all the elements going to make up the tire casing have been assembled on such a core, it is placed while still on the metal core within outer mold members and subjected to great pressure by means of a hydraulic press in a closed chamber which is heated to the desired temperature for the necessary period of time to effect vulcanization. There are variations of this method in practice, but in every case the fabric or threads or cords which constitute the carcass of the tire are formed on a metal core of the shape of the tire cavity. In all cases where the fabric is applied in circumferential strips there is no tension on the threads during vulcanization and the path of any given thread over the core is not the shortest path from edge to edge but merely the variable haphazard result of shaping a flat strip of fabric from the crown or periphery of the core to the edges.

By my invention strain resisting elements or threads may be formed into a multi-ply carcass shaped like a pulley band in such manner and arrangement as to obtain, precisely, any desired condition of tension in the threads in the finished tire. While the threads of any one layer or ply are under substantially the same tension, it is possible to have the threads of one layer relative to the threads of another layer under equal or unequal tension. And further, by varying the width of the laminations or strips of the strain resisting threads, the tension on all of them in the finished tire may be governed to conform to the dictates of the best practice. This same result may be obtained without varying the width of the strips by changing the angles of the threads in all the plies.

In actual practice I preferably lay separate plies of thread fabric successively on each other to form a pulley band, the angles of the threads of succeeding plies having been predetermined with respect to a given tire cavity so that it is possible to form the pulley band into the form and size of tire casing with respect to which the calculations of the angle variations have been made and so that, at such size and shape of tire casing all the threads of all the plies are under similar conditions of tension in the finished casing before it is inflated for use, and the tire casing when inflated for use will not substantially increase its dimensions.

I will first explain the principle on which the carcass of the tire is built.

In Fig. 1 the dotted lines indicate a strip of fabric of parallel threads. In this strip the line A B is one of the threads and coincides with the hypotenuse of the right-angle triangle A B C of which B C is the base and A C the vertical side. If a strip of fabric like that illustrated in Fig. 1 be laid around a drum illustrated diagrammatically in plan in Fig. 2 (actual construction explained hereafter), each of the threads, for instance A B, will be in contact with the face of the drum, the vertical side A C becoming the circumferential distance A' C' while the base B C, being the width of the strip, will be maintained. Now in actual practice this strip of fabric and the number of superposed plies necessary to give the desired strength, are caused to assume the shape of a pneumatic tire casing by lifting the central portion throughout the entire circumference and moving the edges toward each other. But considering this action as applied only to one strip and referring only to one thread A B in order to clearly explain the principle involved, the points A and B will be moved to A² B² and the thread A B will take (approximately) the path of the dotted line a in Fig. 2. Now assume the tire cavity to be represented by the core shown in cross-section in Fig. 3, I have found that in a 36 x 4½ inch tire the thread A B with an angle of fifty degrees (50°) to the base B C and considered as the hypotenuse of a rightangle triangle, must have a base measuring thirteen and three quarter (13¾) inches in order that it may lie in contact with the surface of the core while maintaining the circumferential distance A' C' which is equal to the vertical side A C. The thread A B is shown in dotted lines in Fig. 5 in contact with the surface of the core. But the surface of the same core from edge to edge, on a rightangle section is only ten and one-half (10½) inches, so that if the base B C were a thread it would be three and one-quarter (3¼) inches longer than necessary to extend from edge to edge over the core at right angles. If therefore, we should lay a strip of fabric with the threads lying at an angle of fifty degrees (50°) to the base like that of Fig. 1 on a drum, and then build up on this ply any imaginary pliable material to the proper thickness and then we should lay a strip of fabric whose threads lie at right angles to the edges of the strip like B C and then move the edges of such a composite band toward each other to the points A² B² indicated in Fig. 2, the thread A B would lie in contact with the core without tension and the thread B C would likewise lie over the increased surface from edge to edge without tension. The supposed construction is illustrated in Fig. 4 in flat cross-section and in tire shape in Fig. 3, the filling material being designated by the letter E. Therefore, it follows that after we have laid the first ply in position we may lay a second ply of threads directly over the first ply around the drum at such an angle approaching the rightangle of the thread B C so as to exactly compensate for the increase in the circular distance resulting from the application of the first ply when the plies are moved into tire shape, and so that the threads of the second ply will lie over the first ply in the same tension condition as the threads of the first ply lie over the core while maintaining the same lateral width or base measurement B C. I have indicated such a thread by the line F G in Fig. 1, this second ply thread being laid at an angle of forty-nine and one-half (49½°) degrees, which is substantially correct for a 36 x 4½ inch tire casing built up of plies of fabric consisting of thread and rubber of .047 inch thick strip.

In the drawings—

Figures 1, 2, 3, 4 and 5 are diagrammatic views illustrating a principle of operation involved in the invention.

Fig. 6 is a side elevation of a building drum.

Fig. 7 is a view illustrating the building drum in section along the line 7—7, Fig. 6.

Fig. 11 is a view, partly in side elevation and partly in section, illustrating the forming device, while

Fig. 14 is a cross-section of a mold-inclosing a tire and tube, while Fig. 15 is an enlarged detailed cross-section of one edge of the flat pulley band.

Referring now to the actual construction of a tire embodying my invention, I take a sheet of fabric consisting of parallel threads which may be held together simply by unvulcanized rubber or by a weak weft thread woven across the main warp threads at intervals of approximately half an inch, which is an ordinary method of holding the warp threads parallel. Assuming such a sheet of fabric properly rubberized either by skim-coating or solutioning or by any other desired method, I cut the sheet into strips at the desired angles.

I will now describe the building of a 36 x 4½ inch tire casing, the carcass of which is made up of six plies of thread fabric of .04 inch thickness, attached to or supported by a sheet of rubber of .007 inch thickness.

The first step is to cut the various plies of the desired width and at the predetermined angle. I have found by actual measurement that with a tire casing of this size and using the thread fabric and rubber just before indicated, if the threads of the first ply (that is the innermost ply) lie at an angle of fifty degrees (50°) to the axis of the drum, or, what is the same thing, at an angle of fifty degrees (50°) to a line at right angles to the longitudinal center of the strip, the angle of the second ply should be forty-nine and one-half (49½°) degrees to the axis; in the third ply forty-nine (49°) degrees; in the fourth ply, forty-eight and one-half (48½°) degrees; in the fifth ply forty-eight (48°) degrees; and in the sixth ply forty-seven and one-half (47½°) degrees. These figures are not absolutely correct but practically correct and such as I have used in actual practice. I will hereafter describe how I have arrived at these various angles.

Figure 16:
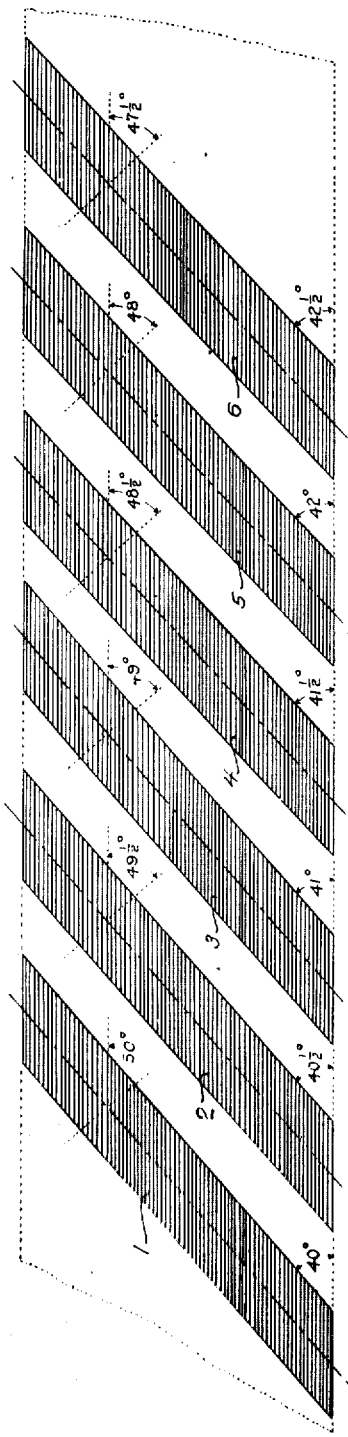
Fig. 16 is a diagrammatic view of a sheet of fabric illustrating the cutting of the fabric strips.

To obtain strips with the proper angles the full width of the fabric is cut along lines which are the complements of these desired angles; that is, the first strip will be cut at an angle of forty (40°) degrees to the edges of the fabric, the second ply strips will be cut at an angle of forty and one-half (40½°) degrees, the third at an angle of forty-one (41°) degrees, the fourth at an angle of forty-one and one-half (41½°) degrees, the fifth at an angle of forty-two (42°) degrees, and the sixth at an angle of forty-two and one-half (42½°) degrees. The various strips are illustrated in Fig. 16, which shows in dotted lines a piece of fabric with the various strips outlined thereon. Of course in practice all the fifty degree (50°) strips will be cut successively and then all the forty-nine and one-half (49½°) degree strips, then the forty-nine (49°) degree strips, and so on, so that there will be no waste in cutting strips at different angles from the same piece of fabric. It will also be understood that the width of the strips will vary, as the edges of the fabric when laid around the drum will be stepped, either outwardly or inwardly, as hereafter explained.

Figure 9:
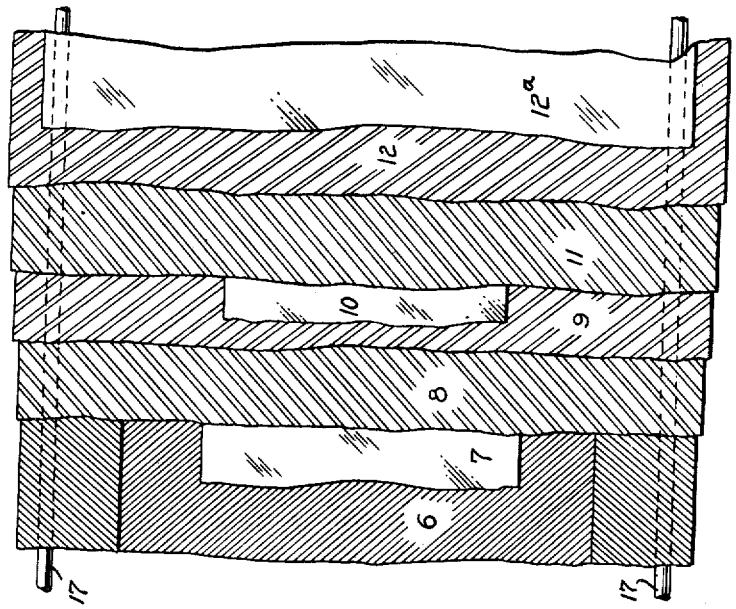
Fig. 9 is a plan view showing the edges of the fabric of the carcass turned over the retaining wires and the various elements of the tread construction applied.
Figure 10:
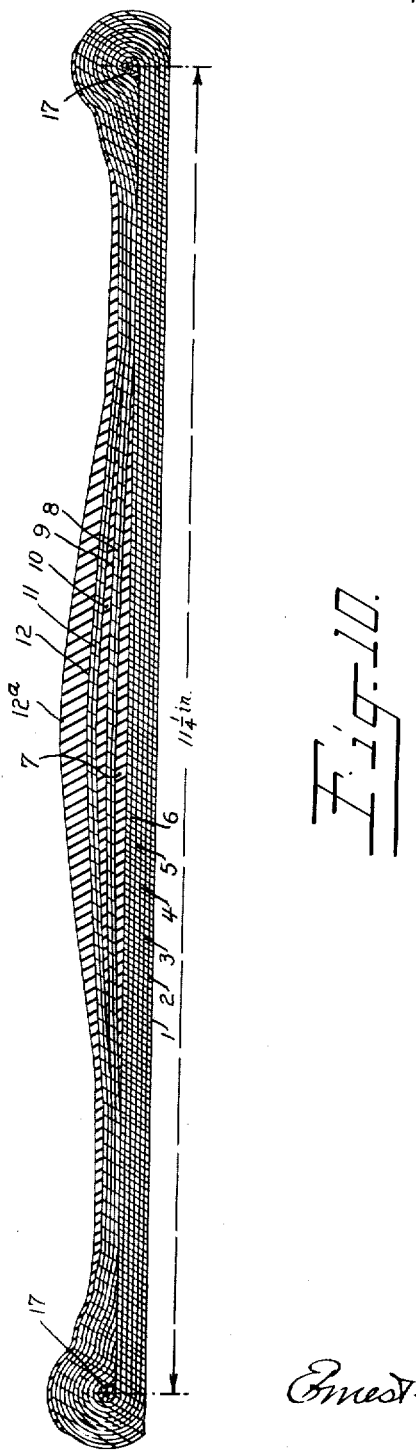
Fig. 10 is a cross-section of the completed casing in pulley-band form.

Assuming we have a supply of the necessary strips of fabric, I take strip number 1, illustrated in Fig. 16, and lay it around a collapsible drum 13, which is suitably mounted on a pedestal 14. The ends of the strip are abutted together so as to form a complete band without lap as the last thread at the end of the strip joins up to the first thread of the strip by the turning of the drum. In Figs. 6 and 7 I have illustrated a form of collapsible drum suitable for the purpose. It is unnecessary here to describe the drum construction in detail. In practice the drum is half way collapsed before the application of the first ply. I next apply strip number 2 with the threads running in the opposite direction, joining the ends of the strip by abutting them just as was done with the first ply. I then place a strip of separating fabric 15 over the edges of these two plies before laying on the next ply, to prevent adhesion of the edge portions to the strip of fabric next applied in order to facilitate the later folding over operation. I then apply the layers numbers 3 and 4 and then interpose another strip of separating material 16 at the edge portions and finally lay on the plies 5 and 6. The next step is to place the circumferential wires 17 in position. To do this, the drum is completely collapsed in order that the wires may be readily placed over the superposed plies into position one from each side of the drum. Once the wires are located in position, the drum is expanded so as to tightly press the layers of fabric against the wires 17. Then the edge portions of the various layers are folded over the wires from each side, two plies being folded over at a time. This operation of folding over two plies at a time is permitted and made easy by the interposition of the separating strips 15 and 16. After the fifth and sixth plies have been folded over, the separating strip 16 is thrown to one side and plies 3 and 4 are folded over. Then the separating strip 15 is removed and the first two plies placed in position on the drum are also folded over the wire. The next operation is to apply a layer of rubber 7 (illustrated in Fig. 9). This rubber strip 7 does not extend from edge to edge of the casing but only across the tread portion and is in fact what is known as the "cushion stock" in the regular construction of tire. Over this rubber layer 7 I place two plies of thread fabric 8 and 9, the threads of these plies being spaced apart and serving as the "breaker" strips. I next apply a layer of rubber 10 similar to the layer 7 and then apply two more "breaker" layers of fabric 11 and 12 and finally apply the tread rubber 12ª. The threads of the breaker layers 8, 9, 11 and 12 are laid at angles of 44°, 43½°, 42°, and 41½° to the axis respectively. Instead of the breaker strips here referred to, the ordinary square woven bias-cut fabric may be used and the width of these breaker strips may be varied as desired. The casing is now complete in pulley band form as illustrated in Fig. 10.

Figure 12:
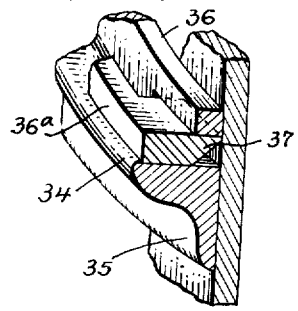
Figs. 12 and 13 are detailed views of the retaining rings shown in Fig. 11.
Figure 13:
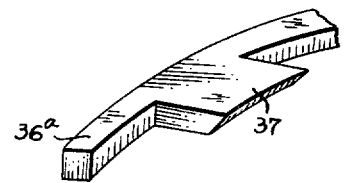

The next operation is to cause the pulley band to assume approximately the U-shape of the finished casing. This I do by lifting the center and simultaneously forcing in the edges, which operation I preferably perform in the manner and by means of apparatus illustrated in Figs. 11, 12, and 13, although any other desired manner and means may be availed of.

Figure 11:
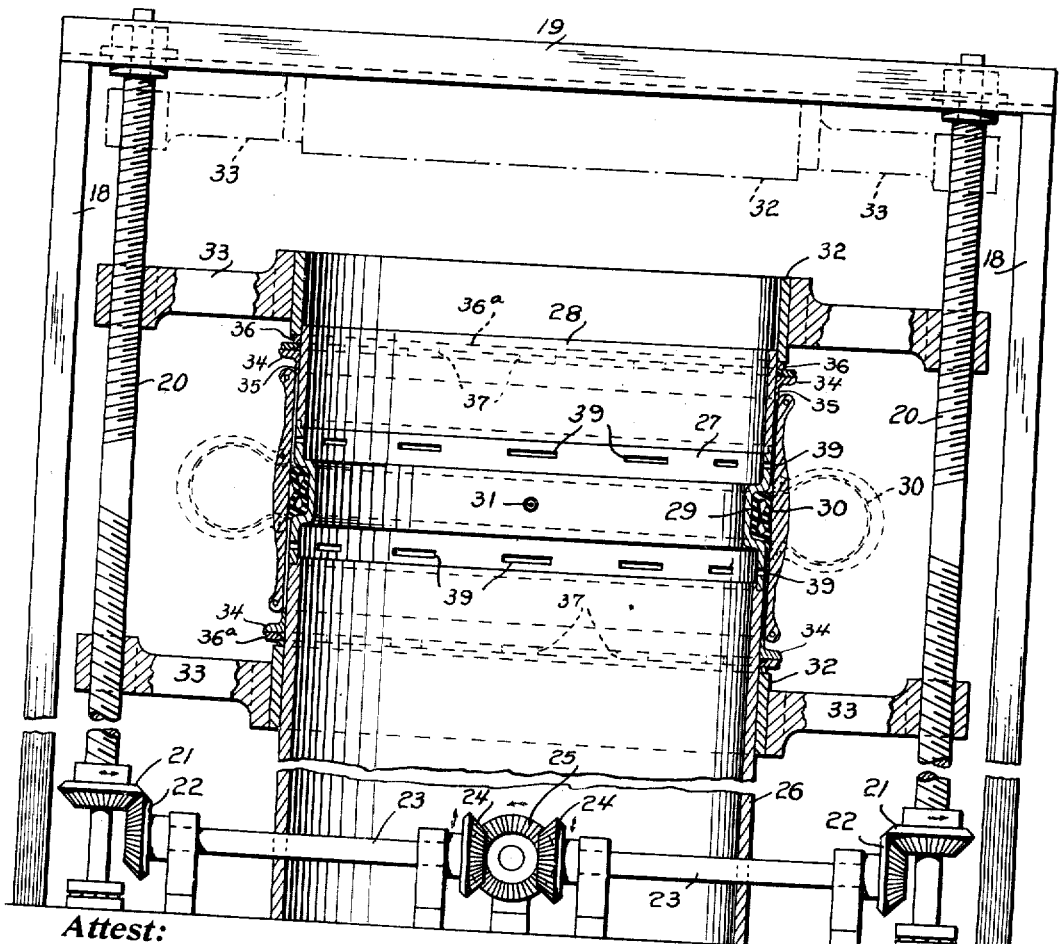

Referring to Fig. 11, the framework of the machine consists of two uprights 18 and a cross-piece 19. Extending from the cross-piece to the base are two threaded rods 20, each of which has secured to it a bevel gear 21, meshing with a bevel gear 22 on shafts 23, each of which shafts carries a bevel gear 24, driven by bevel gear 25 which is connected by any suitable means to a source of power. Centrally located between the uprights is a cylinder 26 on which rests a removable ring 27, which in turn supports a removable ring 28. The ring 27 is provided with a central circumferential channel 29 in which is located an inflating tube 30 having a valve 31. Two forcing rings 32 are provided, each of which is carried on arms 33 having a threaded engagement with the rods 20.

The operation of causing the carcass to be shaped to the form of the tire casing from the flat pulley band form is as follows: The rings 32 are in their positions farthest apart from each other (the position of the upper ring indicated in dotted lines in Fig. 11) and the ring 27 is resting on the cylinder 26 while the ring 28 is entirely removed. This leaves enough space between the top of the ring 27 and the lower edge of the ring 32 to permit of the easy insertion of the pulley band casing. It will be understood that the ring 27 carries the tube 30 ready for inflation at the proper time. The lower flange with its retaining ring are then placed in position. There are two flange and retaining rings, one to co-act with each edge of the casing. Each of these devices comprises an endless flange ring 34 having a shelf or inwardly extending portion 35 and a slotted outwardly extending portion 36. Each of the retaining rings consists of a broken ring of spring metal 36ª having projections 37 beveled on their lower faces and extending into the slots in the outwardly extending portion 36 of the flange 34.

The pulley band casing is now placed in position, as indicated in Fig. 11. Then the ring 28 is placed in position resting on ring 27 and finally the upper flange and retaining ring are placed in position. Power is now applied to gear 25 causing the rods 20 to turn, carrying the forcing rings 32 toward each other. This brings the rings 32 into the positions shown in full lines in Fig. 11, the inward extension 35 of each of the flanges 34 being forced somewhat under the edges of the pulley band casing so that there is a clearance between the inner surface of the pulley band casing and the outer surface of the rings. The further movement of the forcing rings 32 is accomplished simultaneously with the admission of air under pressure to the inflatable tube 30 which lifts the central portion of the pulley band as the forcing rings 32 move the edges of the casing toward each other to a circumferential line on each side of the channel 29 coinciding with the slots 39; and when projections 37 of the retaining rings come to position over these slots they snap into engagement with the slots to lock the flanges in position. Sufficient air pressure is admitted to the inflatable tube to cause the casing to assume tire shape as shown in dotted lines in Fig. 11. The flanges 34 being locked to the ring 27 by the engagement of the projections 37 in the slots 39, the gear 25 is now reversed to move apart the forcing rings 32; then the ring 28 is lifted off the ring 27, which is also lifted off, carrying with it the casing and inflated tube locked in position by the flanges 34 and the retaining rings whose projections 37 are engaging the slots 39.

After the air pressure has had time to act on the casing to more or less set it in tire shape the casing is taken off the ring 27 to be vulcanized. For this purpose I preferably use a special mold consisting of an annular base 40 for the tire (Fig. 14), a "bull ring" 41, outer mold members 42, and straps 43, these straps 43 occurring at intervals throughout both the inner and outer circumferences of the mold and serving to keep the mold members 42 together against the internal pressure. In Fig. 15 I have shown in section a modification of the edge construction of the casing, the first ply in this instance being the narrowest. Of course various modifications of this sort may be made if desired.

Figure 8:
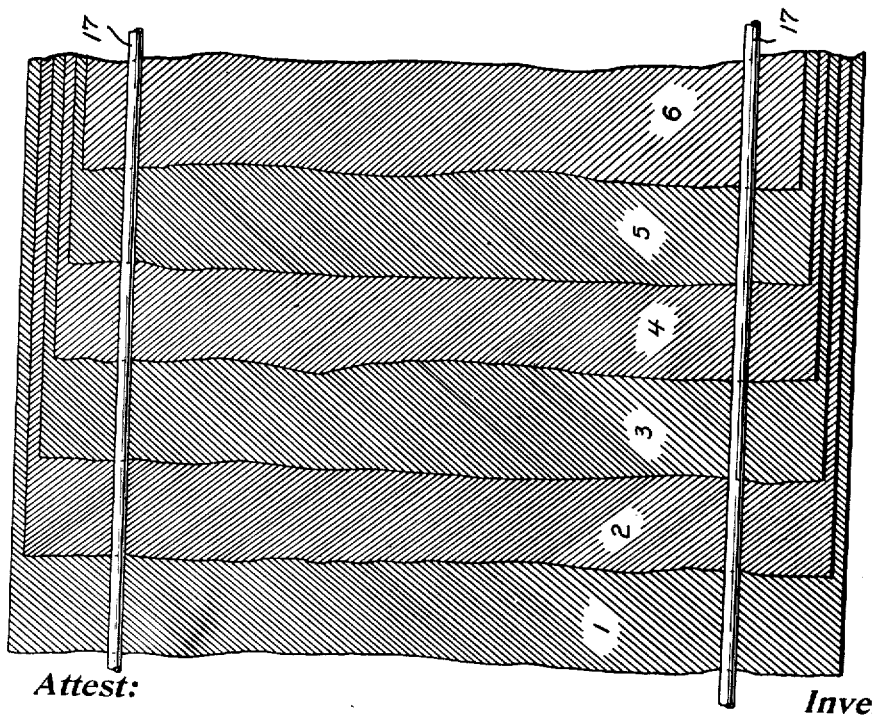
Fig. 8 is a plan view showing the arrangement of the superposed strips of fabric of the carcass before turning the edges over the retaining wires.

To return for a moment to the pulley band casing it should be noted that for the size of tire (36 x 4½"), the building of which I have specifically described, if my first ply consists of parallel threads at an angle of 50° to the axis, the base B C (Fig. 1) must be 13¾ inches in order to give sufficient length to the threads (A B of Fig. 1 for instance) to pass over the desired core or rather casing cavity unstretched and with the circumferential distance A' C' (Figs. 2 and 5). But I cut the first ply fifteen and one-half (15½") inches wide, and succeeding plies fifteen (15") inches, fourteen and one-half (14½") inches, fourteen (14") inches, thirteen and one-half (13½") inches, and thirteen (13") inches, and lay the plies around the drum with their centers coinciding, and then place the side wires 17 on top of the last ply eleven and one-quarter (11¼") inches apart (Figs. 8, 9, and 10). After the portions of the plies extending beyond the side wires 17 have been folded over, a portion of all the plies eleven and one-quarter (11¼") inches wide is held by the side wires 17 to form the carcass during the forming process above described. Now if the threads are to lie over the desired casing cavity without tension, the lateral distance between wires must equal the base B C which is thirteen and three-quarter (13¾") inches, therefore, when I place the wires eleven and one-quarter (11¼") inches apart the inflating process of formation when completed in the vulcanizing operation must stretch the threads considerably and this is one of the objects of the invention. However, while I have placed the side wires 11¼ inches apart, the distance over the core or rather the casing cavity at right angles is only ten and one-half (10½") inches, so, on the one hand the threads are stretched longitudinally while the width of the pulley band or the distance between retaining wires is diminished during the formation of the tire from the pulley band form. And this actually occurs in practice. The distance between the wires of the pulley band in the tires specifically considered is 11¼ inches while in the finished form of the same tire measured over the cavity of the casing, it is only 10½. This of course comes about because the threads of each ply are compelled to move into a (generally speaking) spiral path in which they lie on the tread portion at an angle greater than the original angle of the flat strip. That is to say, in the forming operation the portions of the threads adjacent the bead members and along the sides tend to preserve their angular relation to the axis of the pulley band more than the intermediate or central portions of the threads over the tread of the casing. This is diagrammatically and roughly approximated in the illustration of Fig. 2. As a matter of fact the threads of the first ply which are at an angle of 50° on the flat, take on an angle of 59° on the tread portion of the finished tire. Again, the tire casing in its pulley band form has a diameter of twenty-seven (27) inches while the diameter at the periphery of the outer ply of the carcass in the finished tire (leaving the tread rubber out of consideration) is thirty-five (35) inches; or a difference of twenty-five (25) inches in circumference. One might expect therefore that the threads on the tread portion of the finished tire would be spaced farther apart than in the pulley band form. But this is not so. In the forming process the threads on the tread portion have all passed through a parallelogram movement to produce the increase in angle just spoken of and they are in fact closer together on the tread of the finished tire than in the pulley band form.

Going back now to the placing of the tire in the vulcanizing mold it will be apparent from the explanation immediately foregoing that the formation by inflation before described has not caused the casing to assume its final dimensions, so that when it is placed in the mold consisting of the mold members 42 and rings 40 and 41 it does not fill the mold cavity. It is not necessary to detail the manual processes of taking the casing off the ring 27 and placing it in the mold, except to say that an air-bag or inner tube (either green, semi-vulcanized or fully vulcanized) is placed in the casing and fluid pressure introduced into the tube or air bag. In actual practice I use a semi-cured tube 44 having substantially the dimensions shown in dotted lines in Fig. 14 which approximates the cavity of the casing after it has been taken off the ring 27 and the bull-ring 41 inserted and before the introduction of fluid pressure in the tube 44.

In using a tube to inflate the casing during vulcanization, I accomplish two distinct improvements in that I save the expense of air-bags which ordinarily last only five or six vulcanizations and at the same time save the expense of a portion of the vulcanization of the inner tube and obtain a much improved tube in that it is exactly shaped to the tire cavity. In detail I take a tube which has been semi-cured only sufficiently long to partially set the joints while leaving the outer surface slightly sticky. I then apply one of various substances to the outer surface of the tube and the inner surface of the casing to keep the tube separate from the casing during vulcanization. For this purpose I have successfully used glycerin, talc, graphite, starch, powdered mica, and the paint powder known as "aluminum bronze." I prefer the last mentioned because it leaves the outer surface of the tube and the inner surface of the casing with a beautiful silvery appearance and will serve as a lubricant between the casing and tube when in use. After the coating process the tire and casing are assembled and placed in the mold. I then introduce fluid preferably at a pressure of one hundred eighty (180) pounds to the square inch and place the mold in a heater for a predetermined period, depending on the character of the rubber compounds used. I prefer to use $CO_2$ as the fluid pressure medium, although other mediums may be used. During the vulcanizing process the internal pressure of course increases, due to the vulcanizing heat which is commonly about 280° F. The heat also acts to soften the rubber and hence the internal pressure finds less resistance to its forming action of the casing during the vulcanizing process than when the casing is cold, so that the casing is caused to be pressed firmly against the inner surface of the mold members and the threads of the carcass are tensioned to the desired degree. Upon the completion of the vulcanizing operation the casing and tube are taken out of the mold and separated from each other.

In the present application, while the entire process and apparatus have been described in order that a full understanding of the invention may be had, only certain portions are made the subject of the claims, leaving other portions to be claimed in other applications.

Some of the advantages of the invention are as follows: It permits of the formation of the casing of an automobile tire in pulley band form notwithstanding its necessarily thick heavy construction. This in itself is of great importance for various reasons. The tire may be built much more quickly and cheaply than by any other process. The apparatus is much simpler, cheaper, and lighter than is necessary in any other process. The usual heavy core and necessity for its manipulation are entirely done away with. The threads of the different plies may be sucessively laid at such angles as to exactly compensate for increase in size resulting from the application of previous plies so that the inflating process may act to shape the pulley band into tire shape. It makes it possible to so locate the side rings as to produce in the vulcanized tire a carcass in which the threads are actually under tension independent of any stretch resulting from inflation in use. All the threads lie along substantially their shortest paths from edge to edge. This results in a minimum of internal strains and stresses under the flexing action in use, so that the plies do not separate from each other. It permits of laying the threads at any desired angle. That is the first ply may be laid at 45°, 50°, 60°, and so on, succeeding plies being laid at corresponding angles. This is very important, because the shape of the finished tire under inflation in use largely depends on the angles at which the threads are laid, the general proposition being that the greater the angle of the threads to the axis of the tire the flatter the tire will be on the tread and the less the outward pull on the side wires. And in a tire in which the natural effect of inflation results in a flattened tread and correspondingly greater rounded shape to the side walls, a greater wearing surface is obtained on the tread, and the flexing point in the side wall is not localized but distributed throughout a greater length of side wall which in turn comprises a much greater length of threads. To illustrate, the specific tire the building of which I have described, when molded in a mold designed for an ordinary tire, showed a decrease of one inch in circumference on the periphery and an increase in lateral cross-section at the widest point of one-half inch after inflation as compared with dimensions taken before inflation. This effect is enhanced in a tire made up of plies of fabric in which the threads lie at greater angles to the axis than in the tire referred to. In a tire made according to my invention, the carcass flexes as a unit. Again, there is absolutely no waste in the building operation. The plies are cut to exact size and require no trimming. Another feature that may be referred to is the fact that any configuration of the tread rubber may be obtained in a single vulcanizing operation as against the necessity for separate vulcanization of tread and carcass and an additional vulcanizing operation to unite the two which obtains in the ordinary process of manufacture where an "anti-skid" tread is desired. Incidentally, the cost of vulcanizing the inner tube is lessened and a better tube obtained. In a tire made by the ordinary process of smoothing a flat strip over a core the shape of the tire cavity, the threads of outwardly succeeding plies are longer than the threads of preceding plies and the threads of all the plies are distorted out of their shortest paths, whereas in my tire the threads of succeeding plies are shorter than in preceding plies and all the threads of all the plies lie in substantially their shortest paths, by an amount exactly determined by the angle at which they lie when flat which will allow all the threads to take their natural and substantially shortest paths from edge to edge and when in tire shape to be all under the same condition of stretch. It will be seen too, that as all the plies are laid on the drum at the diameter of the edges of the casing, there is a great saving in the amount of fabric used, as each ply is shorter and because of the unity of action between all the plies, fewer plies are needed. Again the threads of fabric are closer together at the tread portion where relative rigidity and resistance are required and are spaced farther apart and the intervening spaces filled with rubber at the side portions where flexibility is desirable.

If the threads in the fabric strips are laid at a still greater angle, that is to say, commencing in the first ply with threads at an angle of 60° to the axis, I have found that the side wires need not be inextensible, but in lieu of inextensible wires a simple winding of cord may be used to define the edges and form a folding line for the projecting edges of the fabric strips going to make up the carcass. It has been shown that the width between the edges of the tire casing when in the pulley band form, is controlled by the angle of the threads in the various plies, so that with a pulley band in which the threads of the first ply are at an angle of 60°, the width must be still greater than that indicated. The forming action diminishes this lateral distance of the pulley band to the desired lateral distance necessary for the particular tire cavity in mind, and therefore the threads move closer together. This imposes the necessity that the threads shall be spaced sufficiently apart in the pulley band form to permit this action to take place. In such a tire the edge of the casing is extensible when uninflated so that it may be pried over the side flange of a one-piece rim. The result of inflation to riding pressure is to cause the threads to so act on the edges of the tire casing as to bind them to the surface of the rim and cause a hugging action and there is no outward pull on the edges of the casing.

I may say that it is important to determine the angles of the threads in succeeding plies with substantial accuracy, because, mathematically considered, there is only one angle variation between plies which will permit of obtaining exact compensation in any given ply for the increase in circumference in underlying plies resulting from shaping plies of the same width from pulley band form to the form of a torus. This may be determined mathematically, but the calculations are very complex. To enable others to practice the invention, the angles may be determined in the following manner: Having determined the size of tire desired, the number of plies of fabric, thickness of cushion stock and thickness of tread stock, as also the desired inflated cavity, I first make an arc of a core of the cross-sectional shape and size of such desired cavity; then let us say we decide that the threads of our first ply shall be at an angle of 50° flat, we first find what length of a thread at that angle will be necessary to pass from edge to edge of the core. A simple apparatus is desirable for this empirical method of determining the angles. Take a portion of a wide drum of the diameter of the edges of the core, lay the thread on the drum, preserving the 50° angle when flat, which simply means that the circumferential distance between the ends of the thread shall be the same as the altitude A C (Fig. 1) for a given length of thread. Secure each end of the thread to clamping devices, both of which are capable of being moved to and away from the center of the face of the drum and one of which is capable of being moved circumferentially. Then place the core along the center of the drum and manipulate the thread and thread-holding devices by moving them toward and away from the core (and one of them circumferentially) until a circumferential distance between the two ends of the thread is obtained which coincides with the altitude of A C of Fig. 1 for a length of thread (hypotenuse A B of Fig. 1) which it has been found will exactly lie over the core from edge to edge and which when laid on a flat surface will lie at the desired angle of 50°. The base B C will then be measured. A second core is now substituted for the first core, the second core being a facsimile of the first core augmented in size by an amount equal to the first ply. Now we go through the same process to find the angle of the second ply, always maintaining the lateral distance or base measurement B C, because, clearly, the problem requires it, as the retaining wires in the actual construction define the same lateral distance for all plies. This operation is repeated for each ply.

Of course various modifications may be made without departing from the spirit of my invention. For instance, I have described the entire casing as made flat. If desired, only the carcass need be made flat and the desired tread construction applied after the carcass has been shaped from pulley band form to tire form. Further, the particular form of breaker construction here described may be used or the ordinary bias-cut, open-mesh woven fabric may be employed and applied to the carcass in pulley band form or after it has been formed to tire shape.

Throughout the specification I have emphasized the feature of successively varying the angles of the threads in the several plies of rubberized fabric, because that feature in my opinion, is essential to obtaining the best results; but it will be apparent that the method of construction of the tire casing here described may be utilized in a thread fabric tire in which the threads of the several plies are of the same angle, as also in a tire casing made of woven fabric. While I have specifically described and illustrated a straight side tire casing having an inextensible wire located in each edge, the casing may be made with an extensible clencher bead, or may be of the quick detachable type, or may be made with a straight side but without any wire in the edge, so that it will be extensible. In the case last mentioned, the threads will be of the construction referred to in the specification, in which the threads are laid at a comparatively great angle (say 65°) to the axis of the tire, so that the effect of the internal pressure will not tend to lift the tire from the side flanges of the rim.

When in the claims I speak of a tire casing made of a plurality of strips of rubberized fabric formed into an unvulcanized multi-ply pulley band, I mean by the words "plurality" and "multi-ply" to refer to a construction composed of two or more plies.

Having described my invention, what I claim and desire to protect by Letters Patent is:

1. In the method of making a tire casing for motor vehicles, the steps of laying a plurality of separate strips of rubberized fabric on each other to form an unvulcanized multi-ply pulley band, folding over the edges of said pulley band, shaping the unvulcanized pulley band to tire form while maintaining the order of the plies and finally vulcanizing.

2. In the method of making a tire casing for motor vehicles the steps of superposing a plurality of previously formed strips of rubberized fabric to form an unvulcanized multi-ply pulley band with its edge portions substantially in the plane of the pulley band, applying a retaining member to each of said edge portions, giving tire form to the pulley band before vulcanization by distending the central portion and causing the edge portions to move toward each other and in such movement to turn from the plane of the pulley band to substantially final position substantially at right angles to said plane and extending toward the center of the casing, while maintaining the order of the plies, and finally vulcanizing.

3. In the method of making a tire casing for pneumatic tires, the steps of superposing separate strips of rubberized fabric to form an unvulcanized multi-ply pulley band, the threads of each succeeding ply lying at an angle more nearly approaching parallelism with the axis of the pulley band than the threads of a preceding ply, placing a retaining member adjacent each edge of the pulley band, folding the edges of the pulley band over the retaining members, giving tire form to the pulley band before vulcanization, while maintaining the order of the plies, and finally vulcanizing.

4. In the method of making a tire casing for motor vehicles, the steps of superposing a plurality of separate rubberized fabric plies to form an unvulcanized multi-ply pulley band, folding over the edges of the pulley band, forming the unvulcanized pulley band into tire shape while maintaining the order of the plies, and afterward vulcanizing.

5. In the method of making a tire casing for motor vehicles, the steps of wrapping a plurality of separate rubberized fabric plies around a drum to form an unvulcanized multi-ply pulley band, folding over the edges of the pulley band, forming the unvulcanized pulley band into tire shape while maintaining the order of the plies, and afterward vulcanizing.

6. In the method of making a tire casing for motor vehicles, the steps of superposing a plurality of rubberized fabric plies to form an unvulcanized multi-ply pulley band, forming the unvulcanized pulley band into tire shape while maintaining the order of the plies, by simultaneously lifting the pulley band by pressure radially applied along its central circumferential portion and moving the edges toward each other, and there securing them and afterward vulcanizing.

7. In the method of making a tire casing for motor vehicles, the steps of superposing a plurality of separate rubberized fabric plies to form an unvulcanized multi-ply pulley band, the angle of the threads of outwardly succeeding plies progressively varying toward parallelism with the axis, forming the unvulcanized pulley band into tire shape while maintaining the order of the plies, and vulcanizing.

8. In the method of making a tire casing for motor vehicles, the steps of superposing a plurality of rubberized fabric plies around a drum to form an unvulcanized multi-ply pulley band, placing a retaining member adjacent each edge of the pulley band, folding the edges of the pulley band over the retaining member, forming the unvulcanized pulley band into tire shape, while maintaining the order of the plies, and then vulcanizing.

9. The method of making a tire casing for motor vehicles which consists in superposing a plurality of previously formed rubberized fabric plies to form an unvulcanized multi-ply pulley band with its edge portions substantially in the plane of the pulley band, applying a retaining member to each of said edge portions, then applying a layer of tread rubber to the pulley band, forming the unvulcanized pulley band into tire shape by distending the central portion and causing the edge portions to move toward each other and in such movement to turn from the plane of the pulley band to substantially final position substantially at right angles to said plane and extending toward the center of the casing, while maintaining the order of the plies, and finally vulcanizing.

10. The method of making a tire casing for motor vehicles which consists in superposing a plurality of rubberized fabric plies to form an unvulcanized multi-ply pulley band, the angle of the threads of outwardly succeeding plies progressively varying toward parallelism with the axis of the pulley band, forming the unvulcanized pulley band into tire shape while maintaining the order of the plies, and at the same time stretching the threads and finally vulcanizing the casing while the threads are in stretched condition.

11. The method of making a tire casing for motor vehicles which consists in superposing a plurality of rubberized fabric plies over a drum to form an unvulcanized multi-ply pulley band, the angle of the threads of outwardly succeeding plies progressively varying toward parallelism with the axis of the pulley band, folding over the edges of the pulley band, forming the unvulcanized pulley band into tire shape while maintaining the order of the plies, and stretching the threads and finally vulcanizing.

12. The method of making a tire casing for motor vehicles which consists in superposing a plurality of rubberized fabric plies over a drum to form an unvulcanized multi-ply pulley band, the angle of the threads of outwardly succeeding plies progressively varying toward parallelism with the axis of the pulley band, placing retaining members adjacent each edge of the pulley band, folding the edges of the pulley band over the retaining members, forming the unvulcanized pulley band into tire shape while maintaining the order of the plies, and finally vulcanizing.

13. The method of making a tire casing for motor vehicles which consists in superposing a plurality of rubberized fabric plies over a drum to form a pulley band, the angle of the threads of outwardly succeeding plies progressively varying toward parallelism with the axis of the pulley band, placing retaining members adjacent each edge of the pulley band, folding the edges of the pulley band over the retaining members, forming the pulley band into tire shape by lifting the central portion by means of an inflatable tube and simultaneously moving the edges toward each other and finally vulcanizing.

14. The method of making a tire casing for motor vehicles which consists in superposing a plurality of rubberized fabric plies over a collapsible drum to form a pulley band, the angle of the threads of outwardly succeeding plies progressively varying toward parallelism with the axis of the pulley band, placing retaining members adjacent each edge of the pulley band, folding the edges of the pulley band over the retaining members, collapsing the drum and removing the pulley band, forming the pulley band into tire shape by lifting the central portion by means of an inflatable tube and simultaneously moving the edges toward each other, applying rubber and fabric to form the tread portion of the casing and finally vulcanizing.

15. The method of making a tire casing for motor vehicles which consists in superposing a plurality of previously formed rubberized fabric plies to form an unvulcanized multi-ply pulley band carcass with its edge portions substantially in the plane of the pulley band, applying a retaining member to each of said edge portions, applying cushion rubber, a breaker strip of fabric and the tread rubber to the pulley band, forming the unvulcanized pulley band into tire shape by distending the central portion and causing the edge portions to move toward each other and in such movement to turn from the plane of the pulley band to substantially final position substantially at right angles to said plane and extending toward the center of the casing, while maintaining the order of the plies, and finally vulcanizing.

16. In the method of making a tire casing for motor vehicles, the steps of laying a plurality of separate strips of rubberized fabric on each other to form a pulley band, folding over the edges of said pulley band, shaping the pulley band to tire form by the application of fluid pressure to the inside thereof and finally vulcanizing.

17. In the method of making a tire casing for motor vehicles, the steps of laying a plurality of separate strips of rubberized fabric on each other to form a pulley band, folding over the edges of said pulley band, shaping the pulley band to tire form by inflating an expansible air bag within the band, and finally vulcanizing.

18. In the method of making a tire casing for motor vehicles, the steps of wrapping a plurality of separate rubberized fabric plies around a drum to form a pulley band, folding over the edges of the pulley band, forming the pulley band into tire shape by the application of fluid pressure to the inside thereof and afterward vulcanizing.

19. In the method of making a tire casing for motor vehicles, the steps of wrapping a plurality of separate rubberized fabric plies around a drum to form a pulley band, folding over the edges of the pulley band, forming the pulley band into tire shape by inflating an expansible air bag within the band and afterward vulcanizing.

20. The method of making a tire casing for motor vehicles which consists in superposing a plurality of rubberized fabric plies to form a pulley band, the angle of the threads of outwardly succeeding plies progressively varying toward parallelism with the axis of the pulley band, forming the pulley band into tire shape and at the same time stretching the threads by the application of fluid pressure to the inside of the band and finally vulcanizing the casing while the threads are in stretched condition.

21. The method of making a tire casing for motor vehicles which consists in superposing a plurality of rubberized fabric plies to form a pulley band, the angle of the threads of outwardly succeeding plies progressively varying toward parallelism with the axis of the pulley band, forming the pulley band into tire shape and at the same time stretching the threads by inflating an expansible air bag within the band and finally vulcanizing the casing while the threads are in stretched condition.

22. The method of making a tire casing for motor vehicles which consists in superposing a plurality of rubberized fabric plies over a drum to form a pulley band, placing retaining members adjacent each edge of the pulley band, folding the edges of the pulley band over the retaining members, forming the pulley band into tire shape by lifting the central portion by means of an inflatable tube and simultaneously moving the edges toward each other and finally vulcanizing.

23. In the method of making a tire casing for motor vehicles, the steps of forming a pulley band of rubberized fabric in which the threads of such fabric lie at an acute angle to the edges of the pulley band, forming such pulley band into tire shape by applying pressure radially along the central circumferential portion thereof and forcing its edges toward each other, at the same time decreasing the distance on a line passing from edge to edge over the fabric of the pulley band.

24. The method of making a cord-tire casing which consists in forming an annular flat band of diagonally-extending cords, placing a pair of bead-core rings thereover, overlaying said band and rings with a second annular flat band of rubberized cords which extend diagonally across the cords of the first band, inclosing the bead-core rings between the margins of said bands, shaping the raw carcass substantially to its ultimate form by distending the middle portion and drawing the beads closer together, and finishing and vulcanizing the casing.

25. The method of making a cord-tire casing which consists in forming an annular flat band of diagonally-extending cords, placing a pair of inextensible bead-core rings thereover, overlaying said band and rings with a second annular flat band of rubberized cords which extend diagonally across the cords of the first band, wrapping the margins of one of said bands around the core rings and overlapping the margins of the other band upon those of the first band, shaping the raw carcass substantially to its ultimate form by distending the middle portion and drawing the beads closer together, and finishing and vulcanizing the casing.

26. That method of making a tire casing for motor vehicles which includes, forming a laminated pulley band of rubberized strain resisting elements, incorporating bead members in the pulley band at a distance apart greater than the width of the laminations between the beads in the finished tire, forming the pulley band to approximately tire shape and prior to complete vulcanization decreasing the width of the laminations between the beads, and completely vulcanizing.

27. That method of making a tire casing for motor vehicles which includes, forming strain-resisting threads into a fabric strip and at an inclination to its edges, plying up the strips to form a pulley band, incorporating bead members in the pulley band at a distance apart greater than the width of the strips between the beads in the finished tire, forming the pulley band to approximately tire shape and prior to complete vulcanization decreasing the width of the strips between the beads, and completely vulcanizing.

28. That method of making a tire casing for motor vehicles which includes building a plurality of strips of rubberized fabric to form an endless band, placing bead members at the edge portions of the endless band, distending the entire endless band circumferentially and thereby pressing it against the bead members, forming the endless band to approximately tire shape, and finally vulcanizing it in finished form.

29. That method of making a tire casing for motor vehicles which includes forming strain resisting elements into a multi-ply pulley band of a predetermined diameter, relaxing the pulley band, positioning bead members thereon of a diameter greater than said predetermined diameter of the pulley band, expanding the pulley band and pressing it against the bead members, forming the pulley band to approximately tire shape, and finally vulcanizing it in finished form.

Signed at New York, county of New York and State of New York, this 3rd day of January, 1917.

ERNEST HOPKINSON.

DISCLAIMER 1,374,505.—*Ernest Hopkinson*, New York, N. Y. METHOD OF MAKING MOTOR VEHICLE TIRES. Patent dated April 12, 1921. Disclaimer filed June 24, 1936, by the assignee, *United States Rubber Company*.

Hereby enters this disclaimer to claims 16 and 18 of said patent.

[*Official Gazette July 28, 1936.*]